(12) United States Patent
Wiltshire et al.

(10) Patent No.: US 9,715,216 B2
(45) Date of Patent: Jul. 25, 2017

(54) HOLOGRAMS AND FABRICATION PROCESSES

(75) Inventors: John David Wiltshire, Colchester (GB); Patrick Francis Flynn, Halstead (GB); Jonathan Henry Wiltshire, Colchester (GB)

(73) Assignee: AOSYS LIMITED (GB)

( * ) Notice: Subject to any disclaimer, the term of this patent is extended or adjusted under 35 U.S.C. 154(b) by 284 days.

(21) Appl. No.: 13/876,269

(22) PCT Filed: Oct. 5, 2011

(86) PCT No.: PCT/GB2011/051895
§ 371 (c)(1),
(2), (4) Date: May 13, 2013

(87) PCT Pub. No.: WO2012/046048
PCT Pub. Date: Apr. 12, 2012

(65) Prior Publication Data
US 2013/0250382 A1 Sep. 26, 2013

(30) Foreign Application Priority Data
Oct. 6, 2010 (GB) .................................. 1016821.9

(51) Int. Cl.
*G03H 1/26* (2006.01)
*G03H 1/24* (2006.01)

(52) U.S. Cl.
CPC .............. *G03H 1/268* (2013.01); *G03H 1/24* (2013.01); *G03H 2001/269* (2013.01);
(Continued)

(58) Field of Classification Search
CPC ........................ G03H 1/268; G03H 2001/269
See application file for complete search history.

(56) References Cited

U.S. PATENT DOCUMENTS

| 4,067,638 A | 1/1978 | Yano et al. |
| 2002/0159108 A1* | 10/2002 | Baba et al. ....................... 359/9 |

(Continued)

FOREIGN PATENT DOCUMENTS

GB    2 422 742 A    8/2006

OTHER PUBLICATIONS

International Search Report for corresponding PCT/GB2011/051895, completed Dec. 7, 2011 by Gilles Sittler of the EPO.
(Continued)

*Primary Examiner* — Thomas K Pham
*Assistant Examiner* — Cara Rakowski
(74) *Attorney, Agent, or Firm* — Tarolli, Sundheim, Covell & Tummino LLP

(57) ABSTRACT

We fabricate a stereoscopic hologram of an object by capturing a sequence of 2D images of the object, moving camera along a linear axis past the object and keeping the optical axis of the camera perpendicular at each of the positions. The camera lens and image recording surface are translated along the axis such that a fiducial part of the image does not move. The sequence is replayed and a first volume hologram is recorded by recording holograms of the captured images on a diffusing screen in different spatial locations on a surface of the first volume hologram. This is then replayed to form a stereoscopic image of the object and a second, volume reflection hologram of the replayed image is recorded to provide the stereoscopic hologram. A central image of the sequence is aligned to the fiducial part of the holographic image to make the resulting hologram "user-friendly".

12 Claims, 4 Drawing Sheets

(52) U.S. Cl.
CPC . *G03H 2210/441* (2013.01); *G03H 2210/454* (2013.01); *G03H 2222/34* (2013.01)

(56) References Cited

U.S. PATENT DOCUMENTS

| | | | | |
|---|---|---|---|---|
| 2005/0129281 A1* | 6/2005 | Ashizaki | ................ | G03H 1/268 382/112 |
| 2010/0195175 A1* | 8/2010 | Flynn et al. | ....................... | 359/2 |
| 2010/0289819 A1* | 11/2010 | Singh | ..................... | G09G 3/003 345/619 |
| 2011/0216160 A1* | 9/2011 | Martin | ............................ | 348/40 |

OTHER PUBLICATIONS

Molteni WJ: "*Shear Lens Photography for Holographic Stereograms*"; Practical Holography V Feb. 27-Mar. 1, 1991, San Jose,CA Bellingham, WA, US, vol. 1461, Jan. 1, 1991; pp. 132-141, XP000561573; Abstract, p. 133-140.

* cited by examiner

HOLOGRAMS AND FABRICATION PROCESSES

FIELD OF THE INVENTION

This invention relates to methods of fabricating an improved stereoscopic hologram of an object, and to holograms fabricated by such methods. Applications of embodiments of the invention include the fabrication of a 3-dimensional security portrait label.

BACKGROUND TO THE INVENTION

The use of individualised volume holograms as overlays for security documents has been demonstrated by groups such as Bundesdrückerei. The current German passport and ID card comprise volume hologram overlays. Ver-tec Security Systems Ltd described the "Biometrigram system"—see WO2005/034019 which provided a holographic film recording of biometric features suitable as a verification device for high-security documents. Volume reflection holograms can be recorded in a colourless thin layer, perhaps only a few microns thick and supported by a thin carrier film, and as such are highly suitable for application as an overlay to a security document. Further background prior art can be found in WO2010/046687.

Human portraits have regularly been used as the subject for holographic security labels but embossed holograms are by nature, each an identical facsimile of the master image. One of the earliest human portraits used in embossed holography was the well known image representing William Shakespeare produced by Applied Holographics for the protection of an APACS bank card (the "Bard card".). This was an embossed holographic stereogram in full colour, and its image included animation as the viewer moved left to right or tilted the hologram correspondingly; the subject smiling and appearing to speak as the viewing angle changed. Embossed holograms typically comprise an aluminised film, and as such are not suitable for use as an overlay. Therefore, security applications such as the British passport data page have been developed where a thin coating of high reflective index material, such as zinc sulphide, has been used in place of the aluminium layer to enable a relatively transparent layer so as to permit a view of the printed data on the paper directly behind the hologram; but this "h.r.i." layer still retains mirror like qualities which do not permit all of the incident light to be transmitted through the layer without reflection.

Using modern materials, reflection volume holograms have the capability to provide a full colour image comprising, for example, a facial portrait in three dimensions; the whole device contained in a thin, transparent film layer. Animation is possible in the same way as has been achieved in embossed holography as described above.

One of the problems of the rainbow hologram method for embossed holography is that the tilting of the hologram results in a change of colour in the perceived image as each of the colour components cycles through a full range of rainbow colours. This effect is not conducive with the viewer's perception of a recognisable facsimile of a real person. However, the rainbow effect is not the case with reflection holography, as the volume grating effectively acts as a reflective wavelength filter, which is not very susceptible to angular change in the viewing condition.

Another alternative technique for display of three-dimensional images is the use of lenticular displays. An example of a mass produced lenticular portrait is the (limited edition) cover of the CD album "Hours." by David Bowie, in this case a purely decorative device. However, in the British driving licence there is a lenticular image used as a security device which displays driver detail/date information when the plastic licence is tilted.

The thin layer of the holographic film assembly in photopolymer or silver halide is far more convenient to apply to a document or product than a lenticular three-dimensional device whose impressed relief plastic lens device is thicker than a holographic recording film layer. The image quality and resolution of the holographic image is far higher than the maximum resolution of a lenticular image. Typically a holographic stereogram may comprise for example 60 to 100 channels of stereographic or animation information.

The German identity cards made by Bundesdrückerei, include a personalised holographic portrait. But this is two-dimensional and the whole overlay is predominantly in a single colour, except for a small area of the surface which has been chemically treated so as to show a second reflected colour. There is a separate printed ID portrait on the card, which can be compared with the hologram. But monochromatic reflection holograms have a limited security value, because for many years films such as Agfa Holotest recording materials have been available and it is only since the availability of modern high resolution ultra-fine grain silver halide and panchromatic photopolymer recording materials that more complex full colour reflection volume holograms have become a realistic possibility for widespread use.

One of the inherent problems of reflection holography is that, despite the fact that individual monochromatic reflection volume gratings are capable of diffraction efficiency approaching 100%, the application to paper or plastic card documents, which are in many cases not specifically designed in such a way as to present the holographic image in the best circumstances, is often prone to dilute the visual effectiveness of full colour (tri-stimulus) holograms.

For example, a reflection hologram which is highly efficient may be laminated to a document printed upon white paper with a limited quantity of pigment overprint. Thus, despite the high diffraction efficiency of the overlaid reflection hologram, the highly reflective white paper might well cause a dilution of the effectiveness of the hologram by effectively reducing the image contrast therein, since the bright paper is simultaneously visible to the viewer as he or she views the transparent hologram film layer. For example, a red highlight in the holographic image could reflect a high proportion of the red component of the incident light, but the remaining components of the white light will then be transmitted through the hologram bearing film and will be reflected diffusely from the paper below.

Whereas the hologram itself has a narrow reflectivity spectrum, for example reflecting strongly a bandwidth of only say 10 nm, the paper will tend to reflect at a slightly lower of efficiency in that particular wavelength; depending upon the paper quality and its corresponding content of highly reflective white material (such as Titanium Dioxide, Baryta [gelatin-barium sulphate], and the like) but will reflect a high proportion of adjacent wavelengths, which will have the effect of reducing the contrast experienced by the viewer of the reflection hologram.

We are familiar with the experience of viewing scenes recorded photographically or in conventional printing format where the principle of subtractive colour is utilised; but in the case of a hologram, we find a new phenomenon wherein the image contains the usual highlights, but the recording medium, an assembly of a colourless photosensitive layer typically coated upon a transparent film substrate, such as PET, does not contain the absorbent pigments which usually provide stark contrast to the highlights and thus increase the effective "Gamma" of the recorded image.

As an example of this problem, the pupil of the subject's eye in a high quality photographic portrait may importantly be of a very high density black, typically with a strong pinpoint highlight. Details such as this feature, or the shadow details which provide exceptionally important 'depth cues' in photography or printed may easily be disguised or lost by the existence of a pale coloured substrate upon which the translucent holographic film may be overlaid.

This phenomenon of contrast reduction has often also been expressed with regard to embossed holograms, whose silver (aluminised) backing layer is so shiny as to be regarded as having mirror-like qualities. But these specular mirror-like qualities are active only at a precise viewing angle, where the equal angles of incident and reflected light from the silver layer fortunately do not coincide with the angle of diffracted light from the hologram when illuminated at its defined reference angle. Noise within the holographic recorded may also tend to manifest itself as haze which will again deteriorate the effective gamma of the image. Ironically, as a result of the problems described where reduced gamma causes difficulty in the perception of the image detail there is often a requirement expressed to increase the "brightness" of the holographic itself, which frequently introduces further noise into the image and thus actually reduces the colour saturation which is a requirement of the desire for realism.

One solution to this problem of lack of dynamic range in a reflection volume holographic image, which has often been used, is to laminate the hologram layer onto a black under-layer. The result is that the apparent contrast in the holographic image is improved; the absorbent backing has a very high black density and the reflectivity of the hologram grating, which can be of the order of 90% of the incident light at a particular narrow band of wavelengths, is enhanced when viewed against a background which is highly absorbent of zero order light transmitted though the diffracted layer, and effective in absorbing all incident light which does not correspond to the reflective spectrum of the diffraction grating.

However this black under layer has the unsatisfactory effect of making the hologram appear as an undesirable black patch within the document. The present technique avoids this disadvantage in a particularly effective way.

SUMMARY OF THE INVENTION

According to the present invention there is therefore provided a method of fabricating a stereoscopic hologram of an object, the method comprising: capturing a sequence of two-dimensional images of the object, wherein said capturing comprises either: i) moving an image capture device along a substantially linear device-movement axis past said object and capturing an image for said sequence at each of a succession of positions along said device-movement axis, wherein said image capture device has an image recording surface to record an image and a lens or mirror to focus light onto said image recording surface, said lens or mirror having an optical axis which remains substantially perpendicular to said device-movement axis at each of said positions, and wherein said lens or mirror and said image recording surface are translated with respect to one another along said device-movement axis as said image capture device moves such that at each of said succession of positions a fiducial part of an image of said object remains in substantially the same position with respect to said image recording surface, or ii) moving an image capture device along a device-movement axis past said object, capturing an image for said sequence at each of a succession of positions along said device-movement axis, and digitally manipulating said captured images to provide a said sequence of two-dimensional images such that the images appear to have been captured by: moving an image capture device along a substantially linear said device-movement axis past said object and capturing an image for said sequence at each of a succession of positions along said substantially linear device-movement axis, wherein said image capture device has an image recording surface to record an image and a lens or mirror to focus light onto said image recording surface, said lens or mirror having an optical axis which remains substantially perpendicular to said device-movement axis at each of said positions, and wherein said lens or mirror and said image recording surface are translated with respect to one another along said device-movement axis as said image capture device moves such that at each of said succession of positions a fiducial part of an image of said object remains in substantially the same position with respect to said image recording surface; replaying said captured sequence of images one at a time using coherent light to reproduce said sequence of captured images on a diffusing screen; recording a first volume hologram during said replaying of said captured sequence of images, wherein said recording comprises recording holograms of said captured images on said diffusing screen by recording a hologram of each said replayed image of said captured sequence on said diffusing screen in a different spatial location on a surface of said first volume hologram; replaying said first volume hologram to replay together said images recorded in said different spatial locations on said surface of said first volume hologram, said replayed images forming a stereoscopic image of said object in a replay plane of said first volume hologram; and recording a second, volume reflection hologram of said replayed stereoscopic image of said object replayed by said first volume hologram to provide said stereoscopic hologram of said object.

Thus, broadly speaking in embodiments of this method a camera is moved along the linear track alongside the object, or person, whose holographic portrait is to be captured, and the camera lens is translated with respect to the form or imaging sensor so that a fiducial part of the object, for example the eyes of a person, are always in the same position on the film/sensor. In film-based embodiments a reel of 35 mm film may be used to capture the sequence of images; alternatively digital image capture techniques may be employed. This approach is convenient but the skilled person will appreciate that in principle computer image processing techniques could be employed to make perspective and parallax corrections in such a way as to substitute for the above-described filming technique by employing post image-recording correction.

Typically a sequence of between 10 and 100 images may be captured; these will, in the final hologram, provide stereoscopic 3D views of the object. Thus if the track is horizontal and the person is seated or standing, this will result in an image with horizontal parallax when viewed (but no vertical parallax). In other embodiments vertical parallax may be incorporated in the holographic image, for example by recording a matrix of images over a 2D image capture plane, by capturing a plurality of sequences (rows or columns) of 2D images, each as described above, or by using an equivalent computer image manipulation. This could employ multiple cameras and/or several passes of a single camera, for example on a remote control boom mechanism.

In embodiments of the method the capture of the sequence of 2D images is computer-controlled. The distance between the lens or mirror imaging the object and the fiducial part of the object is measured, and movement of the image capture device along the track is also monitored, simple geometry then identifying the degree of relative motion between the lens/mirror and the image recording surface. The computer is then used to translate either or both of the image recording surface and lens/mirror horizontally with respect to one another in order to maintain the image of the fiducial part of the object at substantially the same position on the image recording surface for each captive image.

Once the sequence of images has been captured each is projected by laser onto a diffusing screen to perform an image. The colour components, for example red, green and blue, may be separated (using two or three monochrome sets of captures images) or the captured images may be colour and a 'white' (i.e. combined red, green and blue) laser may be employed to form the image. Each captured image projected onto the diffusing screen by coherent light is recorded as a volume hologram by providing a second laser beam to interfere with the first to generate the (H1) hologram for recordal. A preferred recording medium is a plate from Colour Holographic Limited (London, UK). This H1 hologram may be either a reflection or transmission hologram, but if multiple colours are being recorded simultaneously it is preferable to record H1 as a volume reflection hologram (by employing generally counter-propagating laser beams) in order that the reflection hologram can act as a colour filter.

In some preferred implementations of the method the H1 hologram records each of the captured images replayed on the diffusing screen in a strip on the hologram, using a mask to expose one strip at a time. Thus the result is an H1 hologram in which a set of (in embodiments, vertical) adjacent strips, as many strips as there are captured images, replays the captures images, each captured image showing the object from a slightly different horizontal viewpoint. For example for a portrait of a person a left-most strip may show the left ear of the person, the right-most strip, the right ear of the person, with intermediate images being replayed from the strips in between. As previously mentioned, there may be a single H1 hologram encoding two or three colour components, or two or three H1 holograms each encoding a separate colour component. When employing only two colour components reasonable accuracy can be achieved by employing cyan and orange.

Once the H1 hologram has been formed this is replayed as a whole to replay all the different stereoscopic views of the object at the same time, and these views are recorded together across the surface of a second, H2 volume hologram. In this way the H2 hologram encodes the complete set of captured images. The H2 hologram should be a volume reflection hologram (unless replay of the resulting hologram under laser illumination is envisaged) because the volume reflection hologram will replay well under simple tungsten illumination. In embodiments the H2 hologram encodes all the colour components combined.

The skilled person will appreciate that the H1 hologram of the images on the diffusing screen will replay at the same distance from the H1 hologram as they were recorded—but on the opposite side of the H1 hologram in the case of a volume reflection hologram. It is preferable to locate the H2 hologram, when recording this hologram, in the plane in which the diffusing screen images replay from the H1 hologram, as this also assists non-blurred replay of the H2 hologram under non-coherent, for example tungsten, illumination.

In a convenient physical arrangement of the apparatus the diffusing screen and image projection apparatus is located on a first side of the H1 hologram and the H2 hologram mount for recording the H2 hologram is located on a second opposite side of the H1 hologram, and the H1 hologram is provided with a turntable which allows this to be rotated by 180 degrees. Then the volume reflection hologram can be recorded using a laser illuminating the opposite side of the H1 hologram to the diffusing screen, and then the recorded H1 hologram can be rotated through 180 degrees, replaying as a reflection hologram, with laser illumination from the same side, for example, the same laser illumination, to replay the reflection hologram in the H2 plane.

The distance between the diffusing screen (and equivalently the H2 hologram plane) and the H1 hologram may be relatively large because coherent laser illumination is employed, for example, of order 10 cm.

If one were to view the images replayed by the H1 hologram in the H2 plane what one would see, for a portrait, would be the fiducial part of the object (for example, the eyes) staying in a fixed location and defining a plane, and were the viewer to move their head laterally from side to side the object (head) would appear to rotate about a vertical line in this plane, that is a vertical line between the eyes in a plane defined by the eyes. Thus in the resulting H2 hologram the eyes of all the different stereoscopic views stay in the same location and provide a sharp focal point.

Contrast Enhancement

A further significant advantage is provided by embodiments of the above described approach in which a 2D photograph of the object is used to provide a contrast-enhancing background for the set of holographic volume reflection hologram images providing the stereoscopic views: in general a volume reflection hologram is provided on a black background because a white background can wash out the contrast and disturb the gamma of the image, but a black background is not always practicable and is visually unappealing. In embodiments of holograms provided by the above described method one of the images of the captured 2D sequence is used as a contrast-enhancing background which matches the volume reflection hologram, to enhance the contrast and gamma. In some preferred embodiments the central image of the set of captured images is employed (but this is not essential). More particularly because one of the 2D images used to generate the stereographic hologram is used to provide the contrast-enhancing background image, the two can be exactly aligned. Further, arranging for the fiducial part of the object to define a plane on which each of the 2D stereoscopic views is aligned facilitates the 2D and 3D image alignment to provide the desired contrast. Embodiments of such an approach also create a hologram which is more "viewer-friendly", as it can be easier to see the stored image.

If the hologram is tilted horizontally it appears to have horizontal parallax—that is one can look at the left or right hand side of the object/head, but if the H2 hologram is rotated about a horizontal axis i.e. tilted vertically back and forth, it appears to revert to a simple portrait photograph. If the hologram is rotated about a horizontal axis its image will disappear at the upper and lower limits of the viewing window. However in embodiments where the (central) 2D image is used to provide a contrast-enhancing background, if the hologram/photograph assembly is rotated about a horizontal axis, although the 3D image will disappear the 2D photographic image persists. This provides a significant advantage as, to a user (for example a security officer), the overall viewing experience of chimes with that of viewing a simple 2D photograph.

These features are very important for security checks since the visual effect is of a conventional photograph exactly in registration with a 3D stereoscopic view with horizontal parallax. Thus the image retains the simplicity and desirable features of a conventional photograph but also provides the anti-copying features of a 3D colour hologram of the individual concerned. Furthermore these are in exact registration with one another. This can be contrasted with an approach in which, for example, a conventional photograph is provided in the same general vicinity as a hologram of the person, which is both less secure and less visually satisfying as well as occupying a physically larger area on a document.

Although embodiments of the above described method employ vertical strips to provide horizontal parallax, in principle these may be sub-divided into blocks, and images captured over a 2D matrix of positions rather than along a linear track, these images being recorded in their corresponding set or matrix of blocks on the H1 hologram to provide both horizontal and vertical parallax. Again in the image capture process the lens or mirror is controlled as described above, but in two dimensions rather than just in one dimension.

In some approaches it can be advantageous to record a colour image as separate colour components in the H1 and/or H2 hologram. More particularly it has been observed that whilst fringes from two colours in particular red and green, can effectively be recorded in a single emulsion, recoding a third fringe structure tends to disturb the holographic microstructure and deleteriously effect the recorded holograms. Thus in some preferred embodiments a first colour, for example red and/or green colour component of the second (or first) hologram is recorded in a first layer of emulsion and a second, shorter (for example blue) wavelength component of the second (or first) hologram is recorded in a second layer of emulsion, thus increasing defraction efficiency. Preferably these two layers of emulsion are laminated together, for example by a thin layer of clear adhesive, preferably with the emulsions face-to-face. This latter arrangement helps to hermetically seal the emulsions and also ensures good registration between the two sets of defracting fringes.

Once the second, H2, hologram has been formed, in embodiments this may be copied into a third or subsequent generation volume reflection hologram, depending upon the application. In embodiments this may be achieved by using the H2 hologram as a contact master, for example against Bayer Bayfol HX photopolymer film, and illuminating the combination with white laser light to copy the fringe structure from the H2 hologram to the photoform.

Thus is another aspect of the invention provides a stereoscopic hologram of an object, wherein said hologram comprises a volume reflection hologram recording a plurality of two-dimensional images of said object each viewed from a different angle to provide a plurality of 2D stereoscopic views of said object, and wherein said stereoscopic views are aligned such that a fiducial part of said object defines a plane on which each of said 2D stereoscopic views is aligned such that, on viewing, said object appears to rotate about an axis in said plane as the viewing position is moved.

In preferred embodiments the stereoscopic hologram includes a contrast-enhancing background image, comprising one of the plurality of two-dimensional images of the object, aligned such that the fiducial part of the object in said contrast-enhancing background image is aligned with the fiducial part of the object and the hologram which defines the plane. The 2D images and contrast-enhancing background image may each comprise a two-dimensional photograph. Preferably the contrast-enhancing background image is an image at substantially a central angle amongst the different viewing angles defined by the plurality of two-dimensional images of the object.

BRIEF DESCRIPTION OF THE DRAWINGS

These and other aspects of the invention will now be further described by way of example only, with reference to the accompanying figures in which.

DETAILED DESCRIPTION OF PREFERRED EMBODIMENTS

Figure 1:
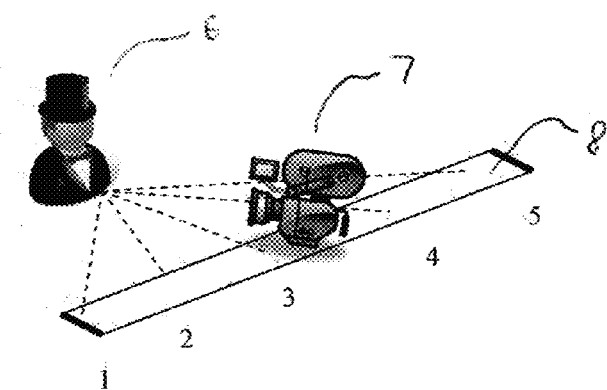
FIG. 1 shows a schematic of a portrait recording system.

Broadly speaking we will describe a method by which a security device can be produced which has advantageous viewing qualities which can be perceived by inexperienced observers even when viewed in lighting conditions which fall short of the ideal "distant point source" which provide optimum image reconstruction in holography. It also has special manufacturing conditions which provide features which are especially useful as a guarantee of authenticity of a document produced by the method.

The present technique can provide an image which is easily appreciated by persons who are not skilled in the handling and viewing of holograms, and such an improvement in the perception of a security image has excellent implications for the value of the integral device as a security system.

One means of producing a holographic stereogram involves the use of a camera which moves along a track in such a way as to record a range of views of the subject matter such that the sequence of film contains a full range of parallax information about the subject. In the case of a facial portrait for example the camera is used to record views of the left side of the face at the beginning of the sequence and as the camera moves in front of the subject the incremental changes to the viewing angle result in a full recording of a sequence of individual views As the camera moves, the film or digital recording stores information from a full range of viewing angles relating to the subject starting with views of the left of the face for example, progressing through the central range of view and ending at the right.

During the transit we can consider that the camera will record a plurality of pairs of views of the face which correspond to the normal binocular pairs which a viewer would observe when looking directly at the subject. These recordings can be made into a hologram by a number of routes. One preferred embodiment of this method is the create a redundant (displaced) original master (H1) recording of the graphics information by dividing the surface of master into segments which contain a sequence of individual views of the subject essentially with the same basic angular geometry as defined by the original recording conditions. Thus the parallax and any animation of the original scene is recorded in the holographic master recording in a similar fashion to the source scene. In this case a second generation hologram can be made with a single exposure for each component colour involved to display all of the parallax and animation recorded in the original master.

There is a need in security holography in some cases to produce individual (personalised) holograms and in this case the best method to produce a final film image of the individual subject might be a technique which is more direct, in that it does involve the production of an intermediate master, which may be time consuming and wasteful of materials to the extent that it could be incompatible with any kind of "real-time" production of the final hologram. Such a method could be an adaption of the technique originally published by Haines for embossed hologram production which has been called "one-step holography". Variations of this type of technology has been used by Zebra Inc and XYZ, to produce large-format hologram holograms in reflection mode; the individual exposure of each pixel of such a large hologram tending to take a prohibitively long period of time.

Advantageously, in the recording of stereographic sequences for this purpose, a preferred approach is to use a camera with a "shear" lens. This system has certain optical advantages which comprise in particular two features which ensure that the resulting holograms have two noticeable advantages: i) that the principle central image features are recorded at a favourable size at the centre of each individual film frame or digital equivalent; and ii) that the camera and associated lens motion means that the recorded image represents the precise view from a plane parallel to the plane of the image, which is an identical configuration to the relationship between the image and the master in the holographic recording process.

Other slightly less elegant methods of recording film or digital recording sequences may alternatively be employed with some success. For example, the portrait subject may sit upon a chair situated on a turntable, so that when the turntable is slowly rotated, a camera in a fixed position in front of the scene is able to record a sequence of views containing information which contains perspective changes as the turntable moves to allow the camera lens to record views of the left and right sides of the subject. In this case, subtle advantages of the moving track system previously described are lost; the lighting for the scene, unless included in the moving turntable, moves unsatisfactorily across the face in such a way that certain "depth-cues" are lost to the viewer; and the sequence of frames probably requires perspective correction to achieve image stability in the hologram which is enhanced by the track recording method.

Other methods are also possible, such as the use of track system without shear mechanism on the camera with the principle defect that the image is recorded in the film or electronic detector array in such a way that each component image is then recorded in a different zone of the film surface; in order to record the whole scene, it is therefore necessary to reduce the image size in order to record all of the views. Other workers have used a curved track for the camera with the effect that the component images are re-centred in the film gate; however the sequence stereographic views still contains curvature of the recording pane which may be incompatible with the hologram mastering technique; furthermore there is a restriction of the freedom to record scenes of various dimensions—i.e. the system used to record a portrait needs to be of different scale to the system used to record an automobile etc.

The techniques described are able to provide sequences of images which can be adapted to achieve sufficiently high quality results for the purpose of portraiture, especially when combined with computerised image processing.

Contrast-Enhancement

In embodiments the central frame of the photographic sequence has a special significance as it is definitive of the view of the final hologram where the viewer effectively has his or her eyes in a central position such that his binocular view is effectively bisected by the frame in question.

Embodiments of the present technique recognise the symmetry of the central hologram-viewing position and the importance of the relationship between the photographic image which defines the central frame of the holographic image; and the holographic three-dimensional image itself. The central photographic frame is therefore printed separately as a conventional photograph. In one preferred embodiment this image is printed on paper as a colour print or a "black and white" print by conventional photography or inkjet or other printing technique.

For example embodiments overlay the said reflection holographic film recording of, for instance, a human face, upon the printed or photographic image of a security document in such a way as to achieve precise register between the printed image and the three dimensional holographic image. Importantly, in a preferred embodiment, the specialised recording technique used for the hologram recording means that an important feature, namely the eyes of the portrait subject, are "locked" in the plane of the film itself, and as such when laminated to the printed image coincide permanently with the conventional planar photographic image even when the viewer takes advantage of the dynamic viewing qualities of the hologram by moving to the left or right to experience a parallax change in features corresponding with other planes within the depth of the image such as the nose, the cheeks, the hair, or the ears, which may appear to the viewer to be displaced from the surface of the hologram recording layer.

One of the problems experienced in enabling the public to appreciate holography is that the somewhat ethereal nature of a holographic image with its dependence upon achieving the correct relationship between illumination and the position of the viewer is that the layperson often tends to find it difficult to perceive the image in the same way as an experienced hologram viewer. For example, they may take some time to achieve a good viewing position and may at first tend to tilt the hologram away from its optimum viewing condition.

For this reason the present method has considerable advantages over the conventional presentation of holograms in security documents. With the aid of this method, we are not restricted from presenting to a casual or inexperienced viewer, the expected view of a photographic or printed image, which we routinely expect of a security document such as a passport identity page. But in this case the conventional printed page with a monochromatic or colour portrait and script relating the ID of the holder is overlaid by a protective film layer bearing a holographic image.

As the viewer examines the image, his or her attention may be first drawn to the relatively routine appearance of the printed ID portrait and associated script. However, given a suitable illumination source the effect of lifting the page to the position where the line of view is perpendicular (normal)

to the page results in the perception of a full colour 3-dimensional image wherein the image contrast and colour of the combined holographic and photographic image produces an effect of exceptional realism and solid appearance which is apparent even to the inexperienced viewer, who is not familiar with holographic imagery.

Thus in an aspect of the invention a device with a high security value is made by combining a three-dimensional diffractive image based upon a sequence of photographic images; one of these individual images being the actual source of the two dimensional printed image, optionally the same size. Preferably the individual graphic image/photograph/view which is the source of the printed two-dimensional image is the central frame of the stereographic sequence giving rise to the three dimensional image. The photographic image may be black and white or full colour or, for example, a stylised print. The 2D information is contained in the silver halide. The hologram may be a reflection hologram or a transmission (or embossed) hologram.

Thus in embodiments the photographic image is black and white although it may also be full colour. Alternatively a stylised print may be employed. In embodiments the 2D information is contained in the silver halide; reflection or transmission (or embossed) holograms may be employed.

Referring now to FIG. 1, this shows a schematic of a portrait recording system wherein the subject (6) sits with proper illumination and a suitable backdrop such as a plain curtain. The recording camera which could be a digital or a conventional film camera is situated upon a computer controlled motion control system. The camera is optionally a "cine" camera or a "still" camera and is programmed to run along motion track in order to record a sequence of views (1, 2, 3, 4, 5 . . . ) which contain a range of angular views of the subject; the view 1 shows the right side of the sitter's face, the view 5 shows more of the left side of the face. The view 3 shows the central view of the face and is of special significance to the method. With a conventional ciné camera (7) it would apparently be necessary to turn the camera to face the subject as it moved along the rail (8), but it is advantageous to use a camera whose lens mount is able to move in front of the film so as to preserve the integrity of the "image plane" of the master.

Figure 2:
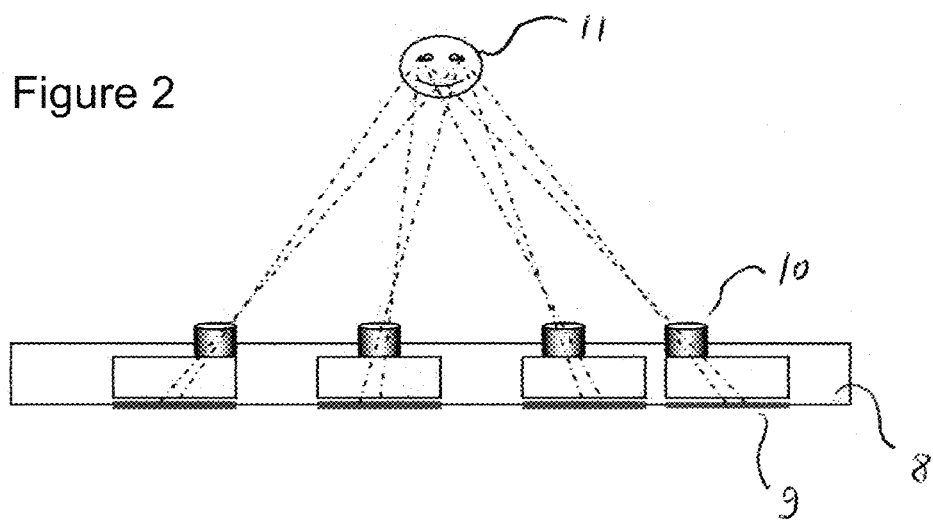
FIG. 2 shows details of a suitable camera configuration.

FIG. 2 shows the detail of a suitable camera configuration. As the camera moves along the track to record the scene (11), the lens (10) is transported laterally by a second, smooth, motion control system in such a way as to facilitate the recording of the image (9) in the central area of each successive film frame. The relationship between the geometry of each image in the sequence and the subject itself is a function of the displacement of the camera position from the centre of the track and represents precisely the same geometrical configuration as will occur in the holographic recording process.

Figure 3:
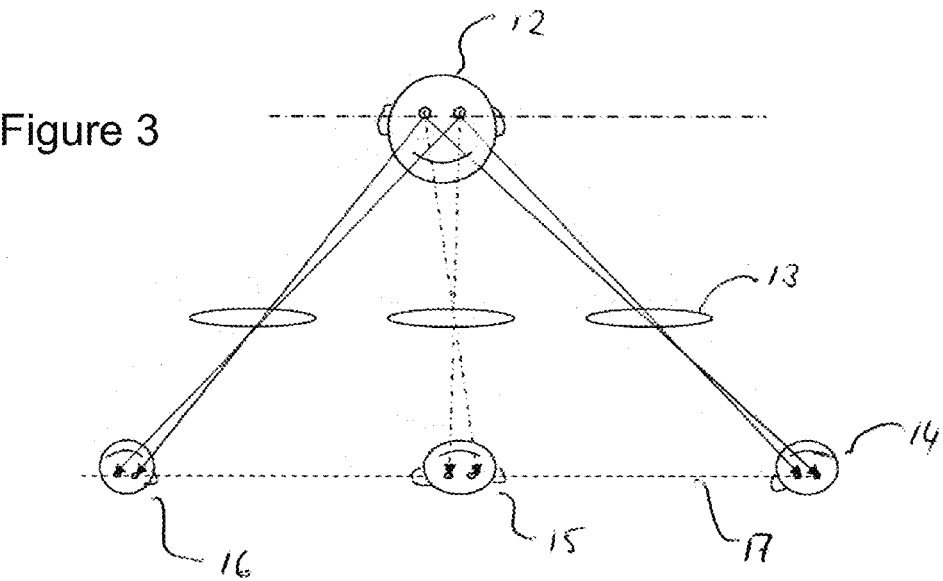
FIG. 3 shows rays of light from the subject of the hologram towards the plane of the image recording surface.

FIG. 3 shows rays of light from the subject of the hologram (12) passing through the mobile lens (13) in the direction of the plane (17) of the recording film or electronic recording surface. The images (14), (15) and (16) differ in the perspective of the specific view of the object as recorded in the film or light detector.

Figure 4:
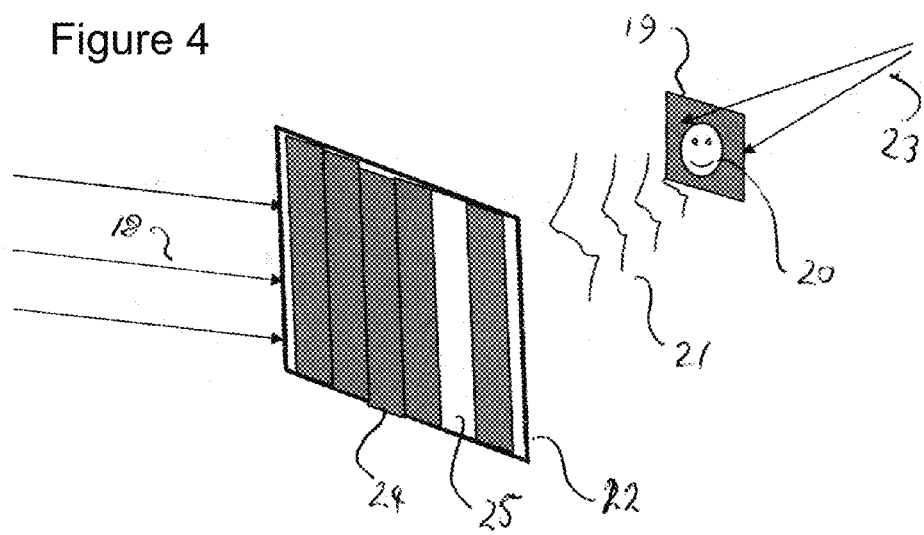
FIG. 4 shows division of a first generation master hologram into a series of vertical channels.

FIG. 4 shows the division of a first generation master hologram (22) into a series of vertical channels (24), (25) such that each of the sequence of images recorded by the camera during its transport can be recorded into a single master hologram. The individual recorded image components (20) are recorded consecutively in the appropriate positions (24), (25) on the master plate. A laser beam in multiple wavelengths (typically red, green and blue) is incident upon the rear of a thin diffuser screen (19). Diffuse light from the image (21) is incident upon the master hologram. In the illustration the image (20) is recorded in the exposed band (25) of the master hologram as the masking system reveals only a single strip of the recording surface (22) of the master at a time. This diffuse light (21) creates a standing wave of interference with the mutually coherent laser beam (18), which is recorded in the master hologram as complex pattern of fringes.

Figure 5:
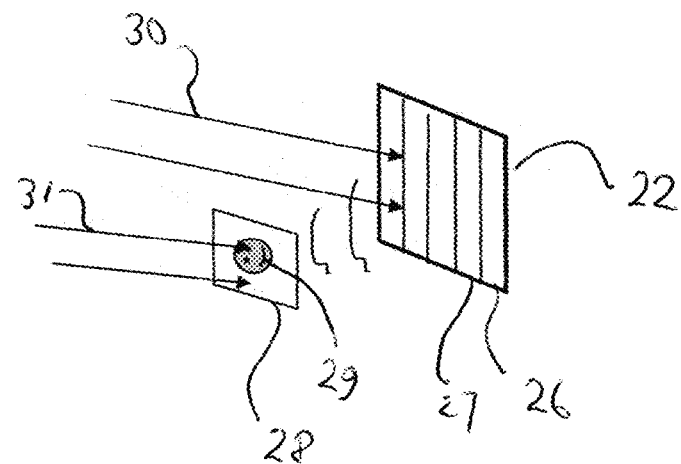
FIG. 5 shows the creation of the second generation hologram.
Figure 6:
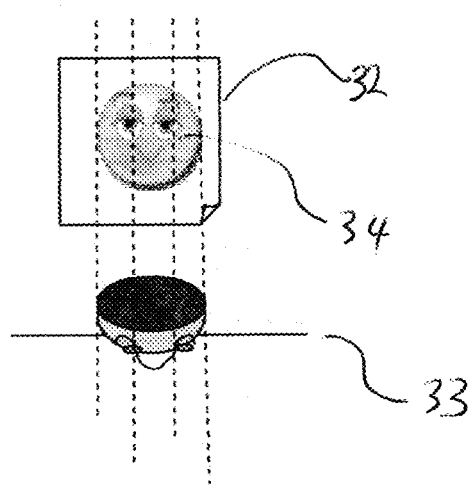
FIG. 6 shows further details of the creation of the second generation hologram.

FIG. 5 shows the creation of the second generation hologram (28) which is further detailed in FIG. 6. This is a white light viewable reflection hologram whose image plane (33), as defined by the focal plane of the original photographic recording (shown as dotted line through the eyes of the subject in FIG. 3) coincides with the surface of the film layer (32). FIG. 5 shows the reconstruction of the first generation (H1) hologram (22) by laser beam (30). Each of the individual image strips (26), (27) . . . are illuminated simultaneously and their component images are reconstructed such that the focal plane of the stereographic hologram series falls within the plane of the recording layer (28). The object light from the first generation master (22) interferes with the mutually coherent reference beam (31) to create a standing wave of interference which is recorded in the film (28).

Figure 7:
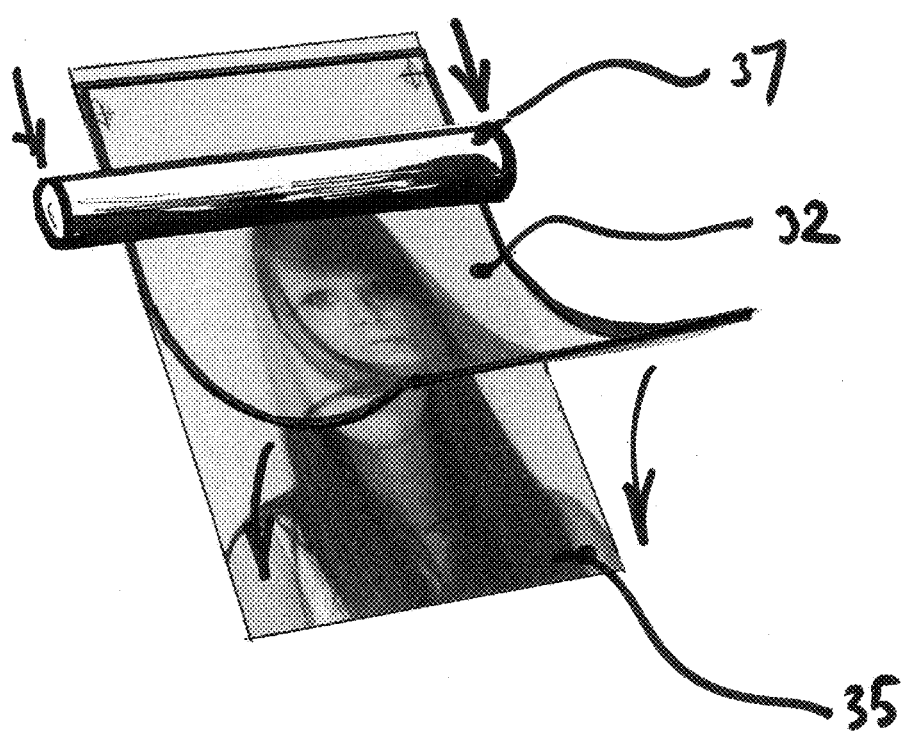
FIG. 7 shows the lamination of the hologram with a two-dimensional photographic or printed image derived from the central image recording position.

FIG. 7 shows lamination with a roller (37), of the two-dimensional photographic or printed image, derived from the central image recording position (3) in FIG. 1, to the holographic film (32) such that the image detail of the image plane of the hologram corresponds precisely in its position and scale in the photographic image (35) printed upon the paper or film (36).

The skilled person will therefore appreciate that embodiments of the approach we describe gives the precise "locked plane" in the hologram which is desirable to match the two-dimensional geometry of the photographic image (so that the eyes, for example, coincide exactly in the 2D and 3D components). If we used, say, a turntable or series of cameras in a curved line or camera toed-in to the subject the plane of the eyes would no longer correspond exactly with the photo 2D element of the combined image.

Thus in some preferred approaches the central frame or frames of the amplitude photography form a contrast-enhancing backdrop when attached to the three dimensional image bearing component. The photographic image may be in the form of pigment or dye printed paper, or film, or conventional photographic medium (silver halide, diazo, or the like), or could even be constituted by unbleached silver in a hologram, and could be 'black and white' (single colour) or multi/full colour imagery. (In an alternative approach the image may even be incorporated within the hologram, as described below).

Overlaying a 3D image, in particular a holographic stereogram on a specific 2D image (photograph) advantageously benefits the perception of the image by providing increased contrast and generally easing the requirements for defined viewing conditions. Moreover the best way to achieve a 3D and 2D image which are truly compatible in this way is by using a frame, particularly a central (specially significant) frame of the stereo sequence as the source of the 2D image.

As previously mentioned, applications of embodiments of the invention include the fabrication of a 3-dimensional security portrait label. Other security applications may comprise alternative "biometric" recordings of, for example, fingerprints or iris details. Applications are not limited to portraiture—over-laminating a photograph will work well with other subject matter, for example a secure ticket for a sporting event or the like could have an image of the trophy prepared in this way.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of fabricating a stereoscopic hologram of an object, the method comprising:
    capturing a sequence of two-dimensional images of the object, wherein said capturing comprises either:
        i) moving an image capture device along a substantially linear device-movement axis past said object and capturing an image for said sequence at each of a succession of positions along said device-movement axis, wherein said image capture device has an image recording surface to record an image and a lens or mirror to focus light onto said image recording surface, said lens or mirror having an optical axis which remains substantially perpendicular to said device-movement axis at each of said positions, and wherein said lens or mirror and said image recording surface are translated with respect to one another along said device-movement axis as said image capture device moves such that at each of said succession of positions a fiducial part of an image of said object remains in substantially the same position with respect to said image recording surface, or
        ii) moving an image capture device along a device-movement axis past said object, capturing an image for said sequence at each of a succession of positions along said device-movement axis, and digitally manipulating said captured images to provide a said sequence of two-dimensional images such that the images appear to have been captured by: moving an image capture device along a substantially linear said device-movement axis past said object and capturing an image for said sequence at each of a succession of positions along said substantially linear device-movement axis, wherein said image capture device has an image recording surface to record an image and a lens or mirror to focus light onto said image recording surface, said lens or mirror having an optical axis which remains substantially perpendicular to said device-movement axis at each of said positions, and wherein said lens or mirror and said image recording surface are translated with respect to one another along said device-movement axis as said image capture device moves such that at each of said succession of positions a fiducial part of an image of said object remains in substantially the same position with respect to said image recording surface;
    replaying said captured sequence of images one at a time using coherent light to reproduce said sequence of captured images on a diffusing screen;
    recording a first volume hologram during said replaying of said captured sequence of images, wherein said recording comprises recording holograms of said captured images on said diffusing screen by recording a hologram of each said replayed image of said captured sequence on said diffusing screen in a different spatial location on a surface of said first volume hologram;
    replaying said first volume hologram to replay together said images recorded in said different spatial locations on said surface of said first volume hologram, said replayed images forming a stereoscopic image of said object in a replay plane of said first volume hologram;
    recording a second, volume reflection hologram of said replayed stereoscopic image of said object replayed by said first volume hologram to provide said stereoscopic hologram of said object; and further comprising:
    providing a contrast-enhancing background image for said second volume reflection hologram, said contrast-enhancing background image being a two-dimensional captured image, derived from said captured sequence of two-dimensional images, which matches said second volume reflection hologram, said contrast-enhancing background image including said fiducial part;
    wherein said contrast-enhancing background image is a planar photographic printed image printed separately to said second volume reflection hologram, and wherein said second volume reflection hologram overlays said printed image;
    wherein the second, volume reflection hologram is a white light viewable reflection hologram whose image plane, as defined by the focal plane of a said captured image, coincides with the surface of a film layer of said second, volume reflection hologram; and
    aligning said fiducial part of said contrast-enhancing background image with said fiducial part in said second volume reflection hologram.

2. A method as claimed in claim 1 wherein said captured two-dimensional images and said contrast-enhancing background images comprise two-dimensional photographs.

3. A method as claimed in claim 1 wherein said contrast-enhancing background image comprises a central image of said captured sequence of two-dimensional images.

4. A method as claimed in claim 1 further comprising locating said second, volume reflection hologram substantially in said replay plane of said first volume reflection hologram during said recording.

5. A method as claimed in claim 1 wherein said recording of a hologram of each said replayed image of said captured sequence on said diffusing screen, in a different spatial location on a surface of said first volume hologram, comprises recording each said replayed image in a successive one of a set of adjacent strip-regions on said surface of said first volume hologram such that said stereoscopic image of said object replayed by said first volume hologram exhibits parallax in a direction perpendicular to a longitudinal direction of said strip-regions.

6. A method as claimed in claim 1 wherein said stereoscopic hologram of said object is a multicolor hologram.

7. A method as claimed in claim 6 wherein one or both of said recording steps uses a white laser.

8. A method as claimed in claim 6 wherein said recording of said second hologram comprises replaying said first hologram in light of a first wavelength and recording a first wavelength component of said second hologram in a first recording medium; replaying said first hologram in light of a second, shorter wavelength and recording a second wavelength component of said second hologram in a second recording medium; and laminating said first and second recording mediums together to form said second hologram.

9. A method as claimed in claim 8 wherein said first and second recording mediums comprise emulsion on a substrate, and wherein said laminating comprises laminating such that said emulsions face one another.

10. A method as claimed in claim 1 further comprising copying said second hologram into a third or subsequent generation volume reflection hologram to provide said stereoscopic hologram of said object.

11. A method as claimed in claim 1 wherein said object is the head of a person, and wherein said fiducial part comprises the eyes of said person.

12. A stereoscopic hologram of an object fabricated by the method of claim 1.

* * * * *